Jan. 24, 1956  J. A. TALALAY  2,731,669
SPONGE RUBBER MOLD

Filed March 2, 1950  2 Sheets-Sheet 1

*INVENTOR.*
JOSEPH ANTON TALALAY

BY Clarence B. Desjardins
HIS ATTORNEY

Jan. 24, 1956   J. A. TALALAY   2,731,669
SPONGE RUBBER MOLD

Filed March 2, 1950   2 Sheets-Sheet 2

*INVENTOR.*
JOSEPH ANTON TALALAY

BY Clarence B. DesJardins
HIS ATTORNEY

United States Patent Office 2,731,669
Patented Jan. 24, 1956

2,731,669
SPONGE RUBBER MOLD

Joseph Anton Talalay, New Haven, Conn., assignor, by mesne assignments, of one-half to The Dayton Rubber Company, Dayton, Ohio, a corporation of Ohio, and one-half to The B. F. Goodrich Company, Akron, Ohio, a corporation of New York Application March 2, 1950, Serial No. 147,243

9 Claims. (Cl. 18—42)

This invention relates to means for sealing molds used in the forming of sponge rubber products of the foamed rubber dispersion type against the escape of the foamed material therefrom and, more particularly, to the provision of a seal around the flanges of a leaf-type mold which will permit the escape of gases therefrom but which will prevent the foamed material from being forced out between the flanges of the mold.

Sponge rubber of the foamed dispersion type, now generally known as foam rubber, is manufactured by foaming a dispersion of either natural or synthetic rubber, transforming the dispersion into a foam, and coagulating the foam followed by vulcanization to produce the final product. In forming molded articles of the foam rubber type, the dispersion is wholly or partially foamed prior to introduction into a mold, or, in certain processes, the foaming may be carried out almost entirely within the mold, followed by coagulation and vulcanization. In one process commonly used, as described in U. S. Patent No. 1,852,447, issued April 5, 1932, on an application filed by Wilfred Henry Chapman et al., the dispersion is foamed by whipping or beating, a chemical coagulant is then added to the foam, and the mixture introduced into the mold where coagulation and vulcanization are carried out. In the process now in use, as described in U. S. Patent No. 2,432,353, issued on December 9, 1947, to Joseph A. Talalay, an unstable oxygen compound, such as hydrogen peroxide, is introduced into the rubber dispersion, preferably in the presence of a catalyst for the decomposition of the oxygen compound. The mixture is then introduced into a mold and foaming occurs through decomposition of the oxygen compound and liberation of oxygen therein. Following this, coagulation is effected by first freezing and then introducing a coagulating fluid into the mold through the cells of the frozen foam. The coagulated product is then vulcanized in the mold and removed in the completed condition. If desired, the foaming may be carried out by the use of a peroxide compound and the foam may be coagulated by the use of chemical coagulants as described in U. S. Patent No. 2,138,081, issued November 29, 1938, on an application filed by Hans Wolf. In molding foam rubber articles by methods such as described above, it frequently happens that during the introduction of the foam into the mold, or during formation of the foam by evolution of gases, air pockets or gas pockets are formed within the mold which, if not eliminated or prevented from forming, will result in the formation of cavities, holes, or depressions in the finished article. These pockets may be eliminated or prevented by the provision of means for permitting the air or gas to escape from the mold.

It has also been found that in carrying out the aforementioned processes, the foamed rubber is frequently forced between the mold flanges due to the development of excessive pressure within the mold or because of non-uniform expansion therein. This results in loss of rubber material with resultant injury to the final product. Therefore, any means for permitting the escape of gases from the mold must at the same time prevent the escape of foamed material therefrom.

Accordingly, it is an object of this invention to provide a seal around the flanges of a leaf mold which will permit gas inside the mold to escape but which will minimize or prevent the expulsion of any of the foamed material from between the flanges of the mold.

Another object of the invention is to provide one or more grooves in the flanges of the mold, which grooves extend continuously around the mold and serve to prevent the escape of the foamed material from the mold. When the material attempts to escape from the mold, the groove or grooves will receive the overflow of the foamed material and will then act as a barrier against further escape of the material.

Another object of the invention is to provide, between the flanges of the mold, an enclosed channel extending continuously around the mold and containing a medium which will permit the escape of any gas formed in the mold, but which will coagulate any of the foamed material coming into contact therewith. Thereby, a barrier will be formed which will prevent any further escape of the foamed material from the mold.

Another object of the invention is to utilize a fibrous or porous material as the gas-pervious sealing medium.

Another object of the invention is to utilize a refrigerated element as the sealing medium.

Further objects of the invention will appear from the detailed description to follow. In this description will be found various examples or embodiments of the invention serving to show the various ways in which the invention may be carried out. These modifications are illustrated in the accompanying drawings, forming a part of this specification, in which.

Figure 1:
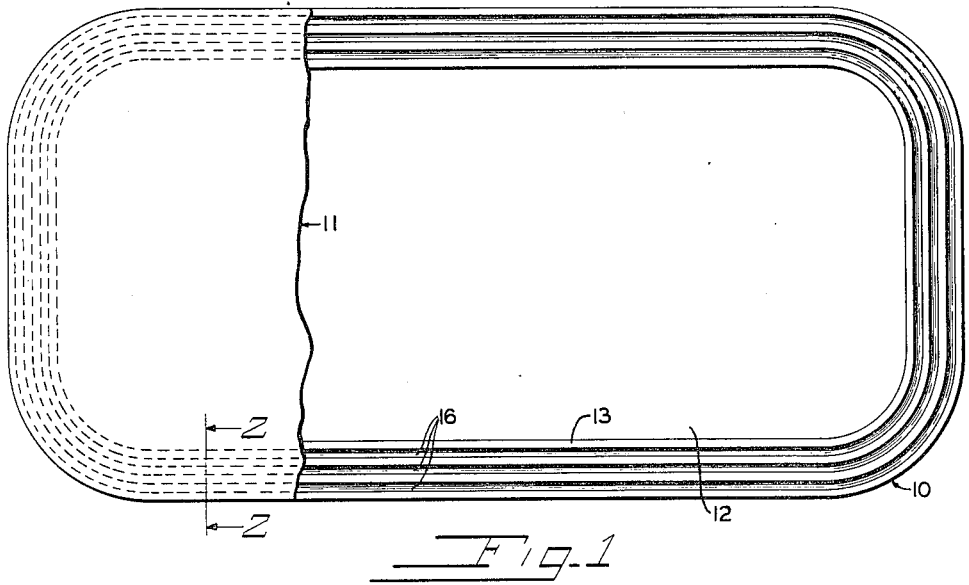
Fig. 1 is a plan view of a sponge rubber mold in which a portion of the upper section is broken away so as to show the three semi-circular grooves formed in the flanges of the mold which extend continuously around the entire periphery thereof.

In molding articles of sponge rubber or rubber-like material, a foamed dispersion of the material is first prepared. This may be done by any one of several different processes; for example, by the process described in U. S. Patent No. 2,432,353, issued on December 9, 1947, to Joseph A. Talalay. According to this process, aqueous rubber dispersions such as natural rubber latex, preferably having a concentration of about 60% or more, are compounded with well known compounding ingredients such as stabilizers, fillers, vulcanizing agents, anti-oxidants, etc. To this compound is then added a given amount of hydrogen peroxide and, while stirring rapidly, there is also added the biochemical enzyme "catalase." Before this mixture has expanded to any substantial degree, it is poured into a shaping mold which is cooled sufficiently to freeze the foamed material. Temperatures of about −20 to −30° C. are generally sufficient for this purpose. Thereafter, the foamed material is coagulated and vulcanized after which it is removed from the mold and washed and dried.

While the process just described is a preferred method of forming sponge rubber articles, it is to be understood that the present invention is not restricted to the use of this process but may be applied with equal success to any of several known processes for forming articles of expanded rubber or rubber-like materials. For example, the preliminary formation of the foam can be effected by any of the known procedures, such as mechanical whipping or beating, chemical gas generation, or physical release of gas or vapor.

The foam rubber dispersions referred to herein may be either natural rubber latex, synthetic rubber latex, artificial dispersions of rubber, or mixtures of these if desired. In general, dispersions having a rubber solids content of 60% or greater are preferred. The synthetic rubber dispersions as referred to herein include those formed from conjugated diolefin polymers, and copolymers with monomers copolymerizable therewith having an ethylenic double bond, such as butadiene-styrene (commonly known as GR–S or Buna-S), butadiene acrylic nitrile (commonly known as GR–A or Buna-N); the polychloroprenes, such as neoprene; and other elastomers which may be formed into aqueous dispersions.

After the foamed material has been introduced into the mold and the latter closed, it often happens that during the expansion of the foam in the closed mold, the gas pressures developed within the mold will cause some of the foamed material to be forced out between the flanges of the mold. In some instances, the amount of material thus expelled may be of such an amount that there will be insufficient material remaining to completely "fill out" the mold. As a result, the finished product may contain depressions or cavities, or the density thereof may vary from one part of the article to another.

In order to overcome this difficulty it is proposed, in accordance with the present invention, to provide a seal around the parting line of the mold which will permit the escape of gas from the mold but will prevent any localized escape of the foamed material from between the flanges of the mold which may result from an unequal expansion of the foamed material in different parts of the mold.

In the present disclosure are shown several different modifications of the invention and, in certain instances, variations of each of these modifications. These will now be explained in detail so as to afford a complete understanding of the invention.

Figure 2:
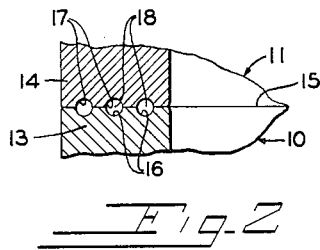
Fig. 2 is a fragmentary, cross-sectional elevation taken along the line 2—2 in Fig. 1, showing the channels formed between the flanges when the mold is closed.

In Fig. 1 is shown a two-part leaf mold, the lower section of which is designated by reference numeral 10. Cooperating with the lower mold section 10 is an upper mold section, designated by reference numeral 11, these two sections constituting a complete mold. The lower section 10 is provided with a cavity 12, and the upper section 11 is likewise provided with a cavity, so that when the mold is closed, the space in the interior of the mold will be of the proper configuration to form the article desired. As further shown in Figs. 1 and 2, the mold sections 10 and 11 are provided with corresponding flanges 13 and 14 which are adapted to come into surface contact with one another, as shown in Fig. 2, when the mold is closed. The line of contact between the flanges 13 and 14 of the two mold sections is indicated in Fig. 2 by the reference character 15 and constitutes what may be termed the "parting line" of the mold.

In accordance with the stated objects of the invention, it is desired to provide a seal between the two mold halves which will permit any entrapped air or gas to escape from the mold at the parting line thereof but which will prevent the foamed material from being forced out between the flanges of the mold. For this purpose, the flanges 13 and 14 are each provided with one or more semi-circular grooves 16 and 17, respectively. As shown in Fig. 1, these grooves extend completely and continuously around the periphery of the mold, and the grooves in the lower and upper sections are so located with respect to one another that, when the mold is closed, the grooves combine to form circular or tubiform channels 18 which are centered on the parting line of the mold. These channels are completely enclosed and extend completely and continuously around the periphery of the mold.

The operation of this form of seal is as follows: Any air or gas entrapped in the mold may pass freely between the flanges which ordinarily do not contact one another with sufficient accuracy to prevent the escape of gaseous matter. However, when the foamed material attempts to pass between flanges 13 and 14 of the mold sections at any given point, it will encounter the channel 18 at that point and will flow into the interior of the channel and cause it to be filled with the foamed material in the vicinity of the point of overflow. The latex material in the channel will thereafter act as a barrier to any further escape of the foamed material at this point and, in effect, will form a self-sealing gasket between the flanges of the mold. When more than one channel 18 is provided, the succeeding channels will take up any overflow from the first channel and thereby provide extra protection against the escape of the material from the mold. It will be seen, therefore, that the channel or channels 18 provided between the flanges 13 and 14 will permit any gas contained within the mold to pass between the flanges and out of the mold but will serve to prevent any overflow of the foamed material. In this connection, it is to be noted that the flanges 13 and 14 do not contact one another with sufficient accuracy to form a gas-tight seal, but due to the irregularities on the surfaces of the flanges, will permit gas in the interior of the mold to escape between the flanges even though the mold is closed.

Figure 3:
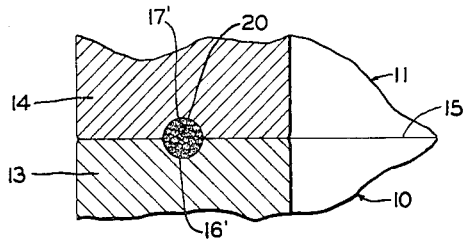
Fig. 3 is a fragmentary, cross-sectional view similar to Fig. 2, but showing a single groove or channel which is filled with a body of fibrous material.
Figure 4:
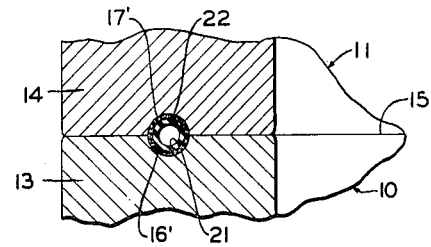
Fig. 4 is a fragmentary, cross-sectional view similar to Fig. 3, but showing a fabric-covered, rubber tube in the channel in place of the fibrous material.

A further modification of the invention is shown in Figs. 3 and 4 of the drawings wherein a fibrous type of sealing element is disposed in the channel formed by grooves 16' and 17'. As shown in Fig. 3, a piece of yarn or cord 20 is located in the channel provided between the flanges. In Fig. 4 the sealing element takes the form of a rubber tube 21 which is provided with a fabric cover 22 which acts to permit the escape of gas from the mold but will prevent the passage of the foamed material therefrom. If desired, after the mold has been closed as shown in Fig. 4, the rubber tube 21 may be inflated by any suitable means provided therefor so as to press the fabric cover 22 firmly into contact with the walls of the channel formed by the grooves 16' and 17'.

The sealing effect of the fibrous material shown in Figs. 3 and 4 is as follows:

When the foamed material within the mold attempts to force its way out between the flanges 13 and 14, it will contact the yarn or cord 20, or the fabric cover 22, and will thereupon lose moisture to the fibrous material and coalesce so as to block further escape of the material at that point. However, the yarn or cord 20, or the fabric cover 22, is of a porous character and will permit the escape of gas from the mold in the desired manner.

Figure 5:
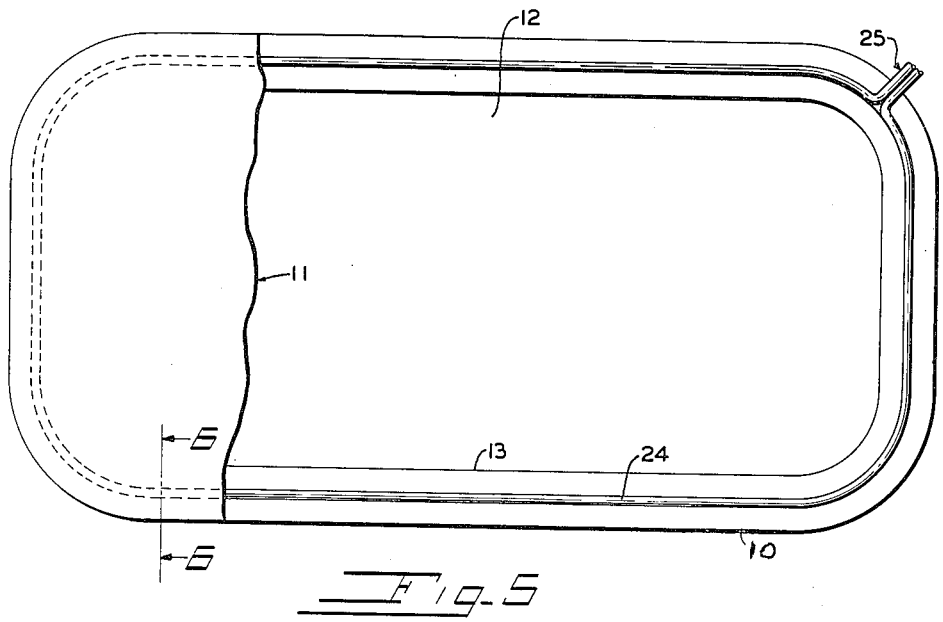
Fig. 5 is a plan view of a sponge rubber mold with a portion of the upper section broken away to show a tube of circular cross section located in the grooves formed in the flanges of the mold.
Figure 6:
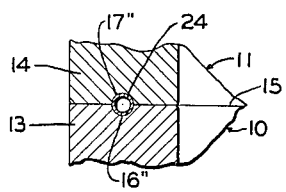
Fig. 6 is a fragmentary, cross-sectional elevation taken along the line 6—6 in Fig. 5 and showing the manner in which the tube is accommodated between the flanges of the mold.

In accordance with a further modification of the invention, the means for sealing the mold may be of a type which will cause freezing of any of the rubber or rubber-like material which comes into contact with it. As shown in Figs. 5 and 6, a tube 24 having an outside diameter slightly less than the diameter of the channel formed by grooves 16" and 17", is shaped to fit the contour of the grooves so that the tube will be accommodated within the channel formed by the grooves when the mold is closed. As shown in Fig. 5, the ends of the tube 24 are let out of the mold as at 25 so as to permit the necessary connections to be made thereto for the purpose of passing a refrigerant through the tube 24. Any desired type of refrigerant may be used for the purposes of this invention, the chief consideration for the present purpose being that the temperature of the tube shall be low enough to cause the foamed material to quickly solidify when it comes into contact with the tube while endeavoring to escape from the mold. The further escape of the material will thereby be prevented. It will be observed, however, that gas within the mold will be free to escape between the mold sections inasmuch as the tube 24 is slightly smaller in diameter than the channel formed by the grooves 16" and 17", and also by reason of the fact that the minor irregularities existing in the tube and in the grooves formed in the flanges of the mold will be sufficient to insure the free passage of the gas around the tube and out of the mold.

Figure 7:
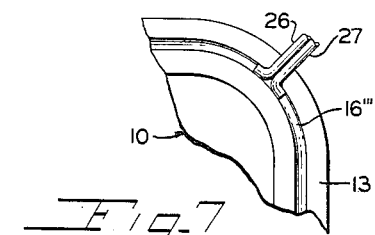
Fig. 7 is a plan view of a fragment of the mold illustrating a further embodiment of the invention.

Another example of the means which may be employed to cause solidification of the foamed material as it attempts to escape from between the sections of the mold is illustrated in Fig. 7. As herein shown, supply and discharge tubes 26 and 27 are provided for introducing and circulating a gaseous or liquid coagulant through the closed channel formed by groove 16''' provided in the flange of the lower mold section and a corresponding groove formed in the flange of the upper mold section.

The tubes 26 and 27 may be connected on the exterior of the mold with suitable means for enabling any desirable type of liquid or gaseous type of coagulant to be introduced into the channel between the mold halves, and to cause this coagulant to be circulated through the channel during the time that the foamed material is undergoing expansion within the mold. By this means, a seal is provided which will permit the escape of gas from the interior of the mold but which will cause any of the foamed rubber or rubber-like material, which might attempt to pass between the flanges of the mold, to be coagulated or solidified upon entering the channel through which the coagulant is circulated and thus serve to seal the mold against any further escape of the foamed material.

Having thus described my invention, what I claim as new and useful and desire to secure by United States Letters Patent, is:

1. A shaping mold for setting and vulcanizing foamed rubber dispersions comprising a pair of cooperating mold sections, a flange extending around the periphery of each of said sections, said flanges being adapted to contact one another when the mold is closed, a groove formed in each of said flanges and extending longitudinally thereof completely around the mold, said grooves being so located that when the mold is closed, one groove will lie directly above the other groove and thereby form a continuous, tubiform channel extending completely around the mold, and means for circulating a fluid coagulant through said channel, when the mold is closed, whereby any air or gas in the mold may escape therefrom, while any overflow of the foamed rubber dispersion will be coagulated upon entering said channel and will thereafter act as a barrier and prevent any further escape of the foamed rubber dispersion from the mold.

2. A shaping mold for setting and vulcanizing foamed rubber dispersions comprising a pair of cooperating mold sections, a flange extending around the periphery of each of said sections, said flanges being adapted to contact one another when the mold is closed, a groove formed in each of said flanges and extending longitudinally thereof completely around the mold, said grooves being so located that when the mold is closed, one groove will lie directly over the other groove and thereby form a continuous, tubiform channel extending completely around the mold, and a porous, fibrous element located within said channel and substantially filling the same for permitting air or gas to escape from the mold while causing any of the foamed rubber dispersion overflowing the mold to coalesce when it contacts said element so as to form a barrier which will prevent any further escape of the foamed rubber dispersion from the mold.

3. The combination recited by claim 2 in which said fibrous element consists of a length of yarn of suitable size and shape to fit in said channel and substantially fill the same when the mold is closed.

4. The combination recited by claim 2 in which said fibrous element consists of a length of cord of suitable size and shape to fit in said channel and substantially fill the same when the mold is closed.

5. A shaping mold for setting and vulcanizing foamed rubber dispersions comprising a pair of cooperating mold sections, a flange extending around the periphery of each of said sections, said flanges being adapted to contact one another when the mold is closed, a groove formed in each of said flanges and extending longitudinally thereof completely around the mold, said grooves being so located that when the mold is closed, the groove in one of said flanges will lie directly over the groove in the other of said flanges and thereby form a continuous, tubiform channel extending completely around the mold, and a rubber tube located in said channel, said tube being provided with a porous, fabric cover and being of such a size as to substantially fill the channel when the mold is closed, whereby a dam will be provided between the mold sections which will permit the escape of air or gas from the mold while preventing the escape of foamed rubber dispersion therefrom.

6. The combination recited by claim 5 including means for inflating said tube so as to cause the fabric cover thereof to be pressed into intimate contact with the walls of said channel.

7. A shaping mold for setting and vulcanizing foamed rubber dispersions comprising a pair of cooperating mold sections, a flange extending around the periphery of each of said sections, said flanges being adapted to contact one another when the mold is closed, a groove formed in each of said flanges and extending longitudinally thereof completely around the mold, said grooves being so located that when the mold is closed, one groove will lie directly over the other groove and thereby form a continuous, tubiform channel extending completely around the mold, a tube located within said channel, and means for circulating a refrigerated medium through said tube whereby any air or gas entrapped within said mold may pass around the tube and out of the mold, while any of the foamed rubber dispersion overflowing the mold will solidify when it contacts said tube and thereby form a barrier which will prevent any further escape of the foamed rubber dispersion from the mold.

8. An apparatus for forming shaped articles of a foamed rubber dispersion comprising a multi-section leaf mold having a cavity therein for receiving the partially foamed rubber dispersion and for containing the dispersion and forming it into the desired shape while the foaming progresses, a peripheral flange formed on each mold section at the parting line of the mold, said flanges being adapted to meet in an imperfect face-to-face relationship when the mold is closed so as to form a vent at the parting line of the mold through which air and gas from within the mold cavity may escape during expansion of the foamed rubber dispersion contained therein, means provided in the flanges to intercept any of the foamed rubber dispersion attempting to follow the air and gas out of the mold, said means including a groove formed in the face of each flange and extending longitudinally thereof around the entire mold, said grooves being so arranged that, when the mold is closed, the groove in one flange will lie directly over the groove in the other flange to thereby form a tubiform channel extending around the entire mold at the parting line thereof, and means contained within said channel for permitting the escape of air and gas from the mold while blocking the passage of foamed rubber dispersion therefrom.

9. Molding apparatus for forming shaped, cellular articles of a foamed, aqueous dispersion of rubber or rubber-like material comprising a mold having a cavity therein for receiving the dispersion and forming it into an article of the desired shape, said mold including a plurality of mold sections each provided with a peripherally extending lip of substantial width adapted to meet with a lip of another mold section when the mold is closed and confine the dispersion within the cavity of the mold, and means between said lips for permitting air and gas to escape from the mold cavity during expansion of the foamed dispersion and for intercepting any of the foamed dispersion attempting to follow the air and gas out of the mold and for congealing an ingredient of the dispersion so as to form a barrier to the flow of any additional dispersion out of the mold, said means including a strand of fibrous, porous material extending peripherally around the mold between the lips for presenting to the dispersion coming into contact therewith an extensive surface for congealing said ingredient of the dispersion by extensive surface contact therewith, the width of said strand being substantially less than the width of said lips so that said strand may be wholly confined within the space between the lips of adjoining mold sections.

References Cited in the file of this patent

UNITED STATES PATENTS

| Number | Name | Date |
|---|---|---|
| Re. 23,176 | Milner | Nov. 29, 1949 |
| 511,893 | Jeffrey | Jan. 2, 1894 |
| 717,604 | Oelkers | Jan. 6, 1903 |
| 806,472 | Jeffrey | Dec. 5, 1905 |
| 923,585 | Schacht | June 1, 1909 |
| 1,353,477 | Jamieson | Sept. 21, 1920 |
| 1,597,761 | Burt | Aug. 31, 1926 |
| 1,610,286 | Hood et al. | Dec. 14, 1926 |
| 1,642,755 | Ward | Sept. 20, 1927 |
| 1,752,295 | Felix | Apr. 1, 1930 |
| 2,092,880 | Hunter | Sept. 14, 1937 |
| 2,148,079 | Martin, Jr. | Feb. 21, 1939 |
| 2,191,703 | Anderson | Feb. 27, 1940 |
| 2,206,757 | Talalay | July 2, 1940 |
| 2,240,581 | Seward et al. | May 6, 1941 |
| 2,265,823 | Talalay | Dec. 9, 1941 |
| 2,266,831 | Tegarty | Dec. 23, 1941 |
| 2,314,176 | Talalay | Mar. 16, 1943 |
| 2,354,241 | Anderson | July 25, 1944 |
| 2,394,122 | Urmston | Feb. 5, 1946 |
| 2,396,406 | Anderson | Mar. 12, 1946 |
| 2,452,382 | Long | Oct. 26, 1948 |